(12) United States Patent
Nah et al.

(10) Patent No.: US 9,803,600 B2
(45) Date of Patent: Oct. 31, 2017

(54) DAMPER ASSEMBLY OF HIGH-PRESSURE FUEL PUMP

(71) Applicant: HYUNDAI KEFICO CORPORATION, Gunpo-si, Gyeonggi-do (KR)

(72) Inventors: Eun Woo Nah, Incheon (KR); Sung Ho Lee, Yongin-si (KR); Kyung Chul Han, Seoul (KR); Chun Ky Hong, Gunpo-si (KR)

(73) Assignee: HYUNDAI KEFICO CORPORATION, Gunpo-si, Gyeonggi-Do (KR)

( * ) Notice: Subject to any disclaimer, the term of this patent is extended or adjusted under 35 U.S.C. 154(b) by 0 days.

(21) Appl. No.: 15/093,839

(22) Filed: Apr. 8, 2016

(65) Prior Publication Data

US 2016/0298581 A1 Oct. 13, 2016

(30) Foreign Application Priority Data

Apr. 9, 2015 (KR) .......................... 10-2015-0050352

(51) Int. Cl.
*F16L 55/04* (2006.01)
*F02M 37/00* (2006.01)
(Continued)

(52) U.S. Cl.
CPC ........ *F02M 37/0041* (2013.01); *F02M 55/04* (2013.01); *F16L 55/05* (2013.01)

(58) Field of Classification Search
CPC ........ F16L 55/04; F16L 55/053; F02M 59/06; F02M 59/102
(Continued)

(56) References Cited

U.S. PATENT DOCUMENTS 3,366,144 A * 1/1968 Durst ................ G05D 16/0619
  138/26
5,955,550 A * 9/1999 Jones ................ C08G 18/4236
  525/440.04
(Continued)

FOREIGN PATENT DOCUMENTS

JP 2012-184757 A 9/2012
JP 2013-227877 A 11/2013
(Continued)

OTHER PUBLICATIONS

Korean Intellectual Property Office; Communication dated Apr. 22, 2016 in corresponding Korean Application No. 10-2015-0050352.
(Continued)

*Primary Examiner* — Patrick F Brinson
(74) *Attorney, Agent, or Firm* — Sughrue Mion, PLLC

(57) ABSTRACT

A damper assembly of a high-pressure fuel pump for reducing fuel pulsation, which is capable of reducing the pulsation of a fuel transferred to the high-pressure fuel pump to stabilize the supply of the fuel, having a simplified structure to minimize an installation space and curtailing manufacturing costs, is provided. The damper assembly of the high-pressure fuel pump includes a damper including upper and lower bodies having flange portions formed along a circumference thereof to face each other in a vertical direction, a retainer ring including a curved portion configured to support the damper and a support portion extending from the curved portion in a longitudinal direction, and a cover member configured to surround the damper and the retainer ring. Here, the damper is fixed in a housing as the flange portion of the upper body, the flange portion of the lower body and the curved portion of the retainer ring are welded at welding portions at the same time.

7 Claims, 5 Drawing Sheets

(51) Int. Cl.
*F16L 55/05* (2006.01)
*F02M 55/04* (2006.01)

(58) Field of Classification Search
USPC ...... 138/26, 30; 220/720–724; 417/540, 542
See application file for complete search history.

(56) References Cited

U.S. PATENT DOCUMENTS

| | | | | |
|---|---|---|---|---|
| 6,079,450 | A * | 6/2000 | Onishi | F02M 55/04 138/26 |
| 8,317,501 | B2 * | 11/2012 | Inoue | F04B 37/12 417/540 |
| 8,662,868 | B2 * | 3/2014 | Oikawa | F04B 37/12 417/540 |
| 9,074,593 | B2 * | 7/2015 | Kobayashi | F04B 11/0008 |
| 2008/0289713 | A1 * | 11/2008 | Munakata | F02M 55/04 138/26 |
| 2010/0209274 | A1 * | 8/2010 | Oikawa | F04B 37/12 417/540 |
| 2011/0209687 | A1 * | 9/2011 | Schroeder | F02M 63/005 123/459 |
| 2011/0220419 | A1 * | 9/2011 | Sjodin | B25D 9/145 175/99 |
| 2013/0276929 | A1 * | 10/2013 | Oikawa | F16L 55/04 138/26 |

FOREIGN PATENT DOCUMENTS

| | | |
|---|---|---|
| JP | 2014240658 A | 12/2014 |
| KR | 10-2011-0074891 A | 7/2011 |
| KR | 1020120090452 A | 8/2012 |

OTHER PUBLICATIONS

Korean Intellectual Property Office; Communication dated Dec. 2, 2016 in counterpart application No. 10-2015-0050352.

* cited by examiner

DAMPER ASSEMBLY OF HIGH-PRESSURE FUEL PUMP

CROSS-REFERENCE TO RELATED APPLICATION

This application claims priority to and the benefit of Korean Patent Application No. 10-2005-0050352, filed on Apr. 9, 2015, the disclosure of which is incorporated herein by reference in its entirety.

BACKGROUND

1. Field of the Invention

The present invention relates to a damper assembly of a high-pressure fuel pump, and more particularly, to a damper assembly of a high-pressure fuel pump for reducing fuel pulsation, which is capable of reducing the pulsation of a fuel transferred to the high-pressure fuel pump to stabilize the supply of the fuel, having a simplified structure to minimize an installation space and curtailing manufacturing costs.

2. Discussion of Related Art

Technology for gasoline direct injection (GDI) engines has been developed to improve fuel economy and performance of gasoline engines.

Generally, GDI gasoline engines may have a higher compression ratio than conventional gasoline engines.

In such GDI gasoline engines, a fuel pressure is a very important factor, and thus the GDI gasoline engines require a high-performance high-pressure fuel pump.

The high-pressure fuel pump serves to directly inject a fuel supplied from a fuel tank into a combustion chamber through an injector by converting a pressure of the fuel into a high pressure required for the GDI gasoline engine.

Such a high-pressure fuel pump includes a housing 10 and a piston 20, as shown in FIG. 1.

The housing 10 has an inlet port (not shown) formed at one side thereof for allowing a fuel to flow in through the inlet port, and an outlet port 11 formed at the other side thereof for discharging the fuel under a controlled pressure.

Here, the inlet port is, for example, coupled to a fuel supply unit such as a fuel tank to receive the fuel, and the outlet port 11 is, for example, coupled to a fuel rail in which a plurality of injectors coupled to a cylinder head are installed.

The piston 20 is installed at a lower end of the housing 10 to apply a pressure to the fuel flowing in through the inlet port.

In this case, since a pressure of the fuel may be altered by driving the injectors or the high-pressure fuel pump, a pulsation phenomenon may occur. Therefore, the fuel may be unstably transferred due to the driving of the injectors or the high-pressure fuel pump.

Accordingly, a damper assembly 30 configured to reduce the pulsation of the fuel transferred to the high-pressure fuel pump is provided in the high-pressure fuel pump.

The damper assembly 30 is installed onto a channel configured to couple the piston 20 to the inlet port to reduce the fuel pulsation.

Such a damper assembly 30 generally includes a damper 31 formed in a disk shape, a retainer ring 32 arranged under the damper 31 to support the damper 31 upwards, and a damper spring 33 arranged above the damper 31 to support the damper 31 downwards.

In the case of such a damper assembly 30, when the fuel transferred from the outside of the high-pressure fuel pump due to the driving of the injectors or the high-pressure fuel pump is transferred over the damper 31, a pulsation phenomenon may be reduced as the fuel passes over the damper assembly.

However, the conventional damper assembly 30 has a drawback in that a large installation space is required since the separate parts such as the retainer ring 32 and the damper spring 33 should be used to support the damper 31 interposed therebetween, resulting in increased manufacturing costs due to an increase in the number of parts.

PRIOR ART DOCUMENT

Patent Document

Korean Patent Publication No. 10-2011-0074891 (published on Jul. 4, 2011)

SUMMARY OF THE INVENTION

The present invention is directed to a damper assembly of a high-pressure fuel pump capable of solving problems regarding increases in an installation space and manufacturing costs caused by a complicated assembly structure as a damper is supported by a retainer ring and a damper spring in a conventional high-pressure fuel pump.

The above and other objects, features and advantages of the present invention will become more apparent to those of ordinary skill in the art by describing in detail exemplary embodiments thereof with reference to the accompanying drawings.

According to one aspect of the present invention, there is provided a damper assembly of a high-pressure fuel pump for reducing fuel pulsation, which includes a damper including upper and lower bodies having flange portions formed along a circumference thereof to face each other in a vertical direction, a retainer ring including a curved portion configured to support the damper and a support portion extending from the curved portion in a longitudinal direction, and a cover member configured to surround the damper and the retainer ring. Here, welding portions are simultaneously formed between the flange portion of the upper body and the flange portion of the lower body and between the flange portion of the lower body and the curved portion of the retainer ring to fix the damper in a housing.

The upper body may have a fluctuation portion arranged in a concentric shape on an upper surface thereof.

The lower body may have a fluctuation portion arranged in a concentric shape on a lower surface thereof.

The welding portions may be formed at the flange portion of the upper body, the flange portion of the lower body and the curved portion of the retainer ring to be lined up in a band shape or formed to be spaced at intervals in a spot shape.

The support portion may have a plurality of through holes formed along a circumferential surface thereof.

The cover member may include side plates having an inner surface coming in contact with an outer surface of the retainer ring, and an upper plate coupled between the side plates. Here, the upper plate may be spaced from an upper surface of the damper.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
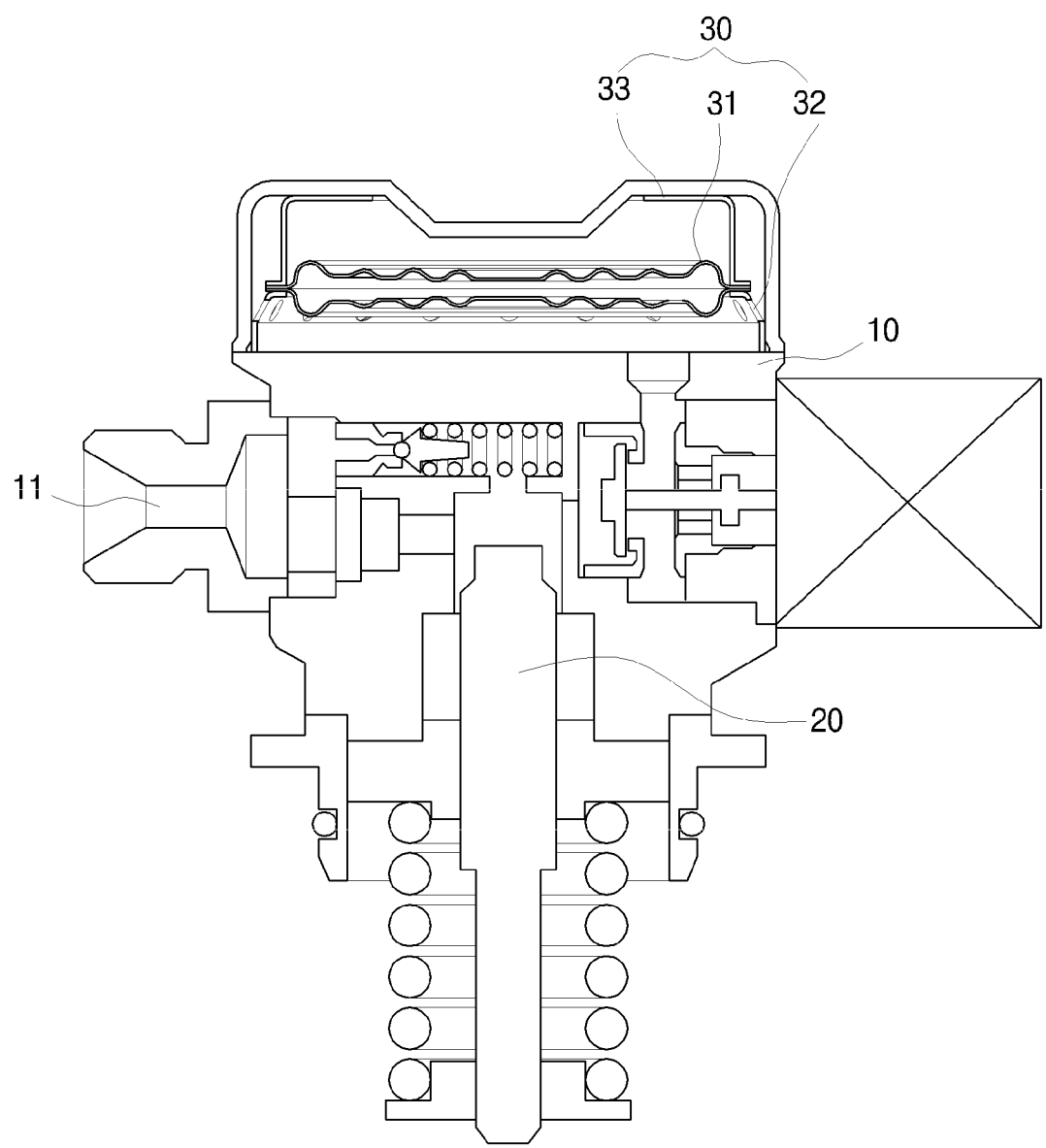
FIG. 1 is a schematic diagram illustrating a conventional damper assembly.

The above and other objects, features and advantages of the present invention will become more apparent with reference to exemplary embodiments which will be described hereinafter with reference to the accompanying drawings. However, the present invention is not limited to exemplary embodiments which will be described hereinafter, and can be implemented as various different types. The exemplary embodiments of the present invention are described below in sufficient detail to enable those of ordinary skill in the art to embody and practice the present invention. The present invention is defined by its claims. Meanwhile, the terminology used herein to describe exemplary embodiments of the invention is not intended to limit the scope of the invention. The articles "a," "an," and "the" are singular in that they have a single referent, but the use of the singular form in the present document should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Hereinafter, exemplary embodiments of the present invention will be described with reference to accompanying drawings. When adding reference numerals to components of each drawing, the same reference numeral is added even when being shown in another drawing with respect to the same component, and when it is determined that a detailed description of a well-known technology related to the present invention can unnecessarily obscure the subject matter of the present invention, the description will be omitted.

Figure 2:
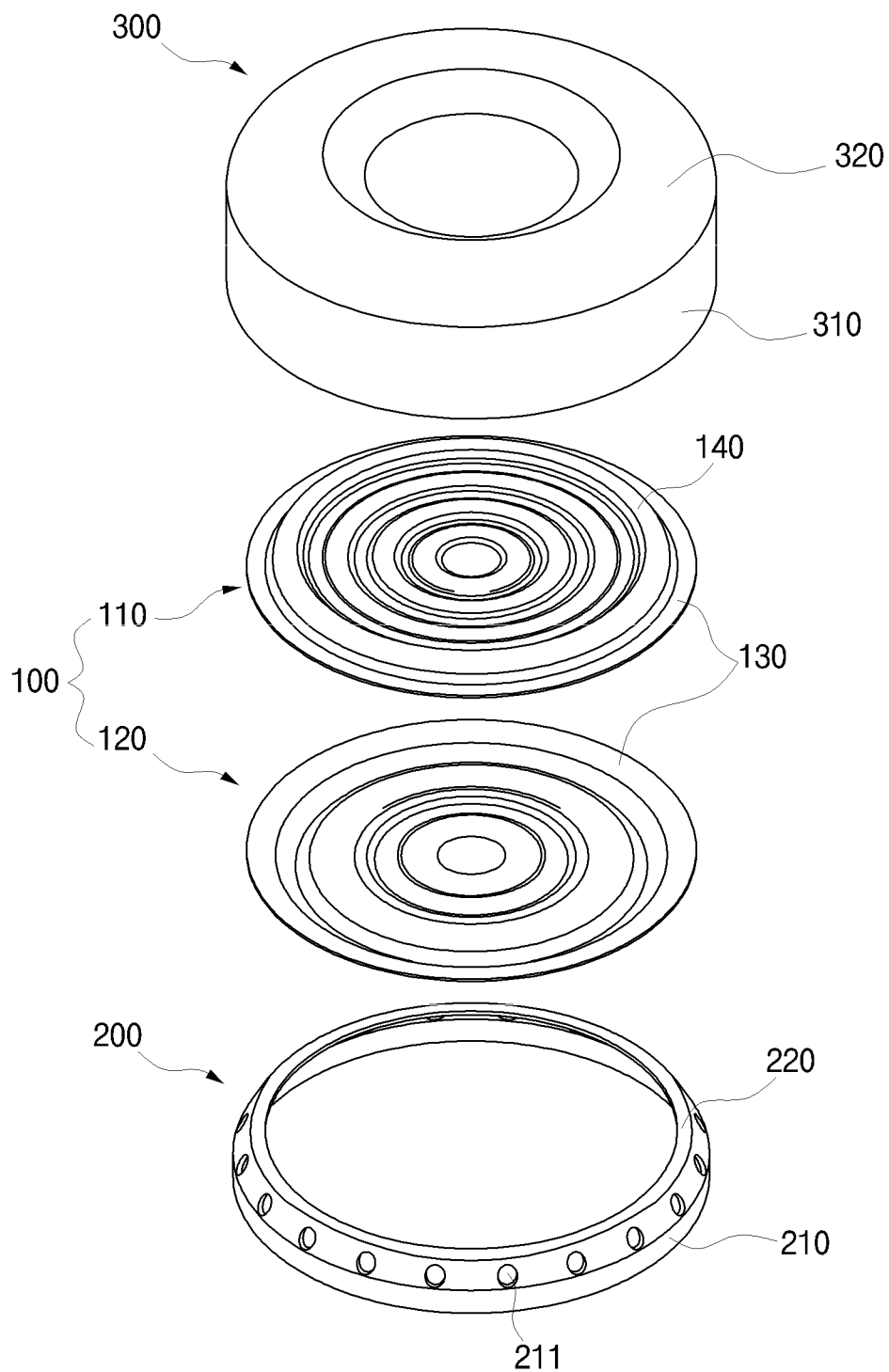
FIG. 2 is an exploded perspective view illustrating a damper assembly according to one exemplary embodiment of the present invention.
Figure 3:
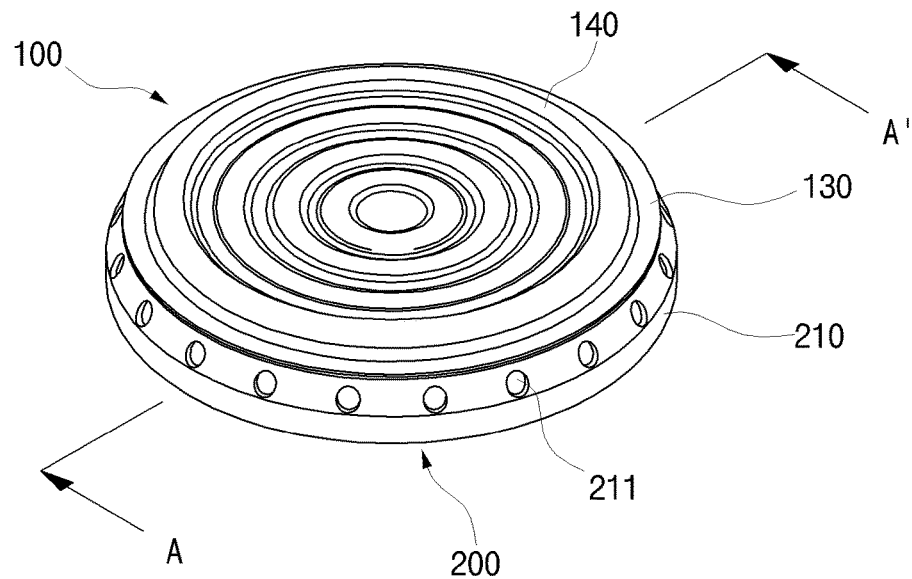
FIG. 3 is a perspective view illustrating the coupling of a retainer ring to a damper in the damper assembly according to one exemplary embodiment of the present invention.
Figure 4:
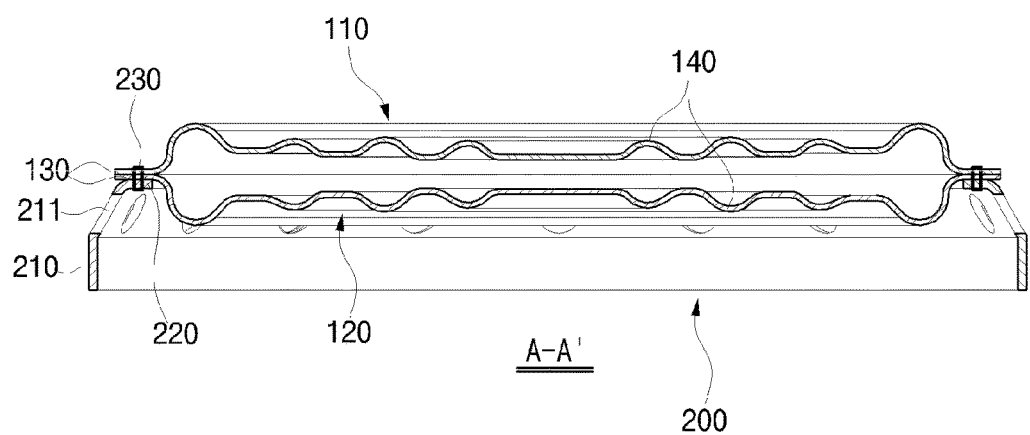
FIG. 4 is a cross-sectional view taken along line A-A' shown in FIG. 3.

A damper assembly of a high-pressure fuel pump according to one exemplary embodiment of the present invention includes a damper 100, a retainer ring 200, and a cover member 300, as shown in FIGS. 2 to 4.

The damper 100 is generally formed in a disk shape, and includes an upper body 110 and a lower body 120 having respective separate configurations to face each other in a vertical direction, as shown in FIG. 2.

Each of the upper body 110 and the lower body 120 includes a flange portion 130 and a fluctuation portion 140.

The flange portions 130 are formed to extend outwards from the circumference of the upper body 110 and the circumference of the lower body 120.

The flange portion 130 of the upper body 110 and the flange portion 130 of the lower body 120 face each other in a vertical direction.

Therefore, the flange portions 130 may be formed to extend outwards from the circumferences of the upper body 110 and the lower body 120 when the upper body 110 and the lower body 120 are assembled to each other, thereby securing a space in which the upper body 110 and the lower body 120 may be welded in order to easily assemble the upper body 110 and the lower body 120 by welding.

Figure 5:
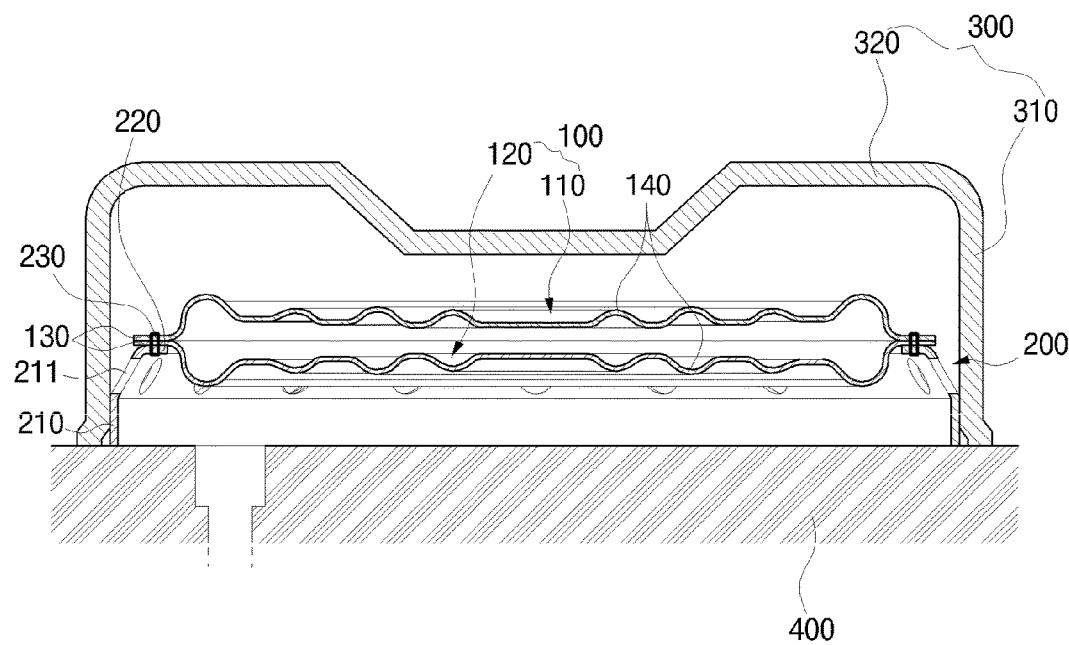
FIG. 5 is a cross-sectional view illustrating the damper assembly installed in a high-pressure fuel pump according to one exemplary embodiment of the present invention.

The fluctuation portions 140 are arranged on an upper surface of the upper body 110 and a lower surface of the lower body 120 in a concentric shape, as shown in FIGS. 4 and 5.

Therefore, a fuel flowing in from the outside of the damper assembly comes in contact with the fluctuation portion 140 when the fuel passes through the damper 100.

As a result, a flow speed of the fuel is reduced due to a fluctuated surface of the fluctuation portion 140.

That is, the fluctuation portion 140 may effectively reduce fuel pulsation caused by driving injectors or a high-pressure fuel pump.

The retainer ring 200 is arranged under the damper 100 to fix the damper 100 in a housing 400 of the high-pressure fuel pump, as shown in FIG. 5.

A lower portion of the retainer ring 200 is fixed in the housing 400 by welding, and an upper portion of the retainer ring 200 comes in contact with a lower surface of the damper 100.

More specifically, an edge of the retainer ring 200 is welded to an edge of the damper 100.

Such a retainer ring 200 includes a support portion 210 and a curved portion 220.

One end of the support portion 210 comes in contact with an upper surface of the housing 400 to be fixed to the upper surface of the housing 400 by welding, and the other end of the support portion 210 is formed to extend in a longitudinal direction.

Such a support portion 210 has through holes 211 formed therein.

The plurality of through holes 211 are formed to be spaced from each other at regular intervals along a circumferential surface of the support portion 210.

As a result, the fuel flowing in from the outside of the damper assembly may be allowed to easily flow in the retainer ring 200 when the fuel flows in the retainer ring 200 through the through holes 211.

The curved portion 220 is curved inwards from the other end of the support portion 210. In this case, an upper surface of the curved portion 220 comes in contact with a lower surface of the damper 100, more particularly a lower surface of the flange portion 130 of the lower body 120 to support the damper 100 upwards.

The cover member 300 serves to hermetically seal the damper 100 and the retainer ring 200 from the outside. In this case, a space is formed inside the cover member 300 to accommodate the damper 100 and the retainer ring 200 in the cover member 300.

Such a cover member 300 includes a side plate 310 and an upper plate 320.

The side plate 310 extends from the cover member 300 in a longitudinal direction, and thus comes in contact with an outer surface of the support portion 210 of the retainer ring 200, as shown in FIG. 5.

Then, one end of the side plate 310 is fixed to the upper surface of the housing 400 by welding, and the other end of the side plate 310 is coupled to the upper plate 320.

The upper plate 320 is coupled between the side plates 310 to hermetically seal the top of the cover member 300.

Also, the upper plate 320 is formed to be spaced from an upper surface of the damper 100.

As a result, a space is formed by the side plate 310 and the upper plate 320 in the cover member 300 to easily accommodate the damper 100 and the retainer ring 200.

A simplified assembly process of the damper assembly according to one exemplary embodiment of the present invention will be described in detail, as follows.

The damper 100 is welded to the retainer ring 200 to be assembled to each other.

More specifically, the upper surface of the curved portion 220 of the retainer ring 200 comes in surface contact with the lower surface of the flange portion 130 of the lower body 120, and an upper surface of the flange portion 130 of the lower body 120 comes in surface contact with a lower surface of the flange portion 130 of the upper body 110, so that the flange portion 130 of the lower body 120 and the flange portion 130 of the upper body 110 are arranged in a vertical direction.

Next, the flange portion 130 of the upper body 110 is welded to the flange portion 130 of the lower body 120, and the flange portion 130 of the lower body 120 is welded to the curved portion 220 of the retainer ring 200, all of which are sequentially stacked to come in surface contact with each other, to form welding portions 230.

That is, the flange portion 130 of the upper body 110, the flange portion 130 of the lower body 120 and the curved portion 220 may be stacked on each other in a vertical direction so that the three members, for example, the flange portion 130 of the upper body 110, the flange portion 130 of the lower body 120 and the curved portion 220, may be easily assembled by welding at the same time.

Therefore, according to this exemplary embodiment, the damper 100 in which the flange portions 130 of the upper body 110 and the lower body 120 are coupled to the curved portion 220 of the retainer ring 200 by welding at the same time is fixed through one retainer ring 200 to have a simplified assembly structure, thereby reducing an assembly space for the damper 100 and the retainer ring 200 and curtailing costs due to a decrease in the number of parts.

In addition, the flange portion 130 of the upper body 110 and the flange portion 130 of the lower body 120 are formed to extend outwards from the circumferences of the upper body 110 and the lower body 120, thereby securing a working space in which the upper body 110 and the lower body 120 may be welded in order to easily assemble the upper body 110, the lower body 120 and the retainer ring 200 by welding.

In this case, when the flange portion 130 of the upper body 110, the flange portion 130 of the lower body 120 and the curved portion 220, all of which are stacked in a vertical direction to come in surface contact with each other, can be coupled by welding at the same time, welding members may be welded to come in contact with an upper surface of the flange portion 130 of the upper body 110 and a lower surface of the curved portion 220 at the same time, and welded to come in contact with either the upper surface of the flange portion 130 of the upper body 110 or the lower surface of the curved portion 220.

Here, the flange portion 130 of the upper body 110, the flange portion 130 of the lower body 120 and the curved portion 220 may be welded using a method such as electric resistance welding or laser welding. When the upper body 110, the lower body 120 and the curved portion 220 can be assembled by welding at the same time, the upper body 110, the lower body 120 and the curved portion 220 may be welded to each other using various methods in addition to the electric resistance welding or the laser welding.

Figure 6A:
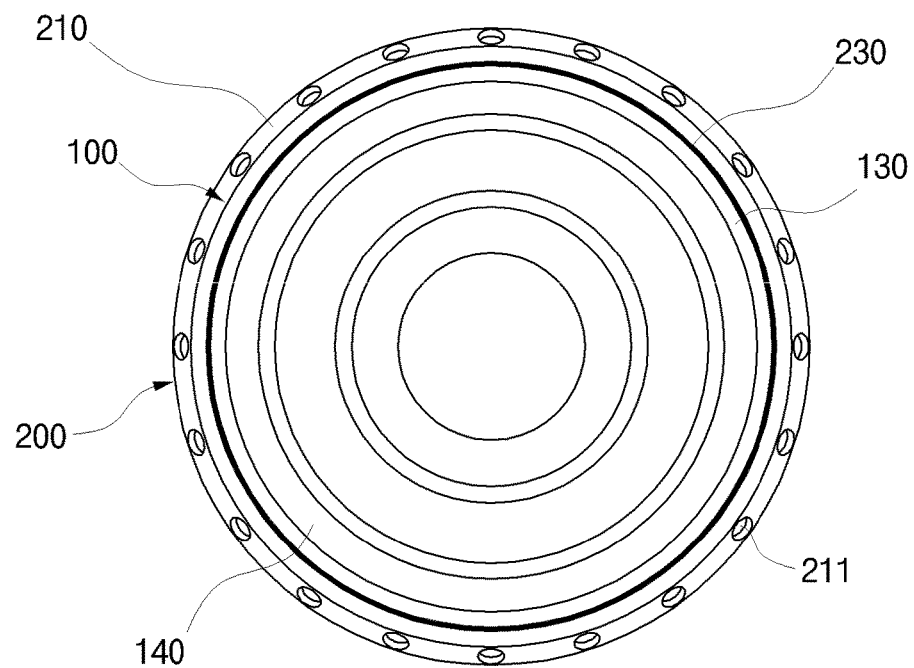
FIGS. 6A and 6B are top views illustrating welding positions in the damper assembly according to one exemplary embodiment of the present invention.
Figure 6B:
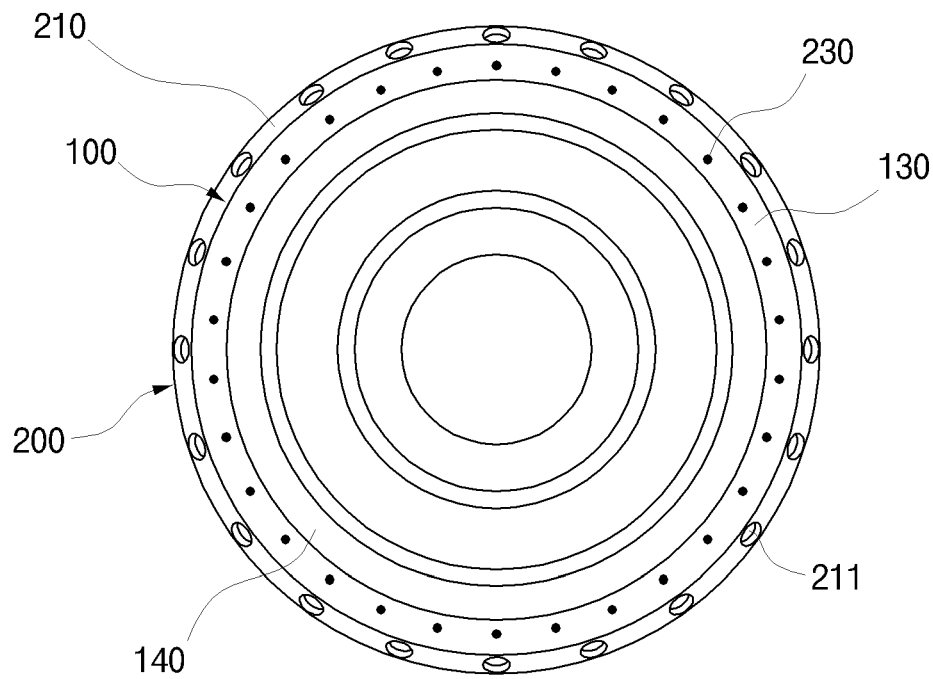

Also, when the flange portion 130 of the upper body 110, the flange portion 130 of the lower body 120 and the curved portion 220 can be welded at the same time, the welding portions 230 formed by welding the flange portion 130 of the upper body 110, the flange portion 130 of the lower body 120 and the curved portion 220 at the same time may be formed to be lined up in a band shape as shown in FIG. 6A, or formed to be spaced from each other at regular intervals in a spot shape as shown in FIG. 6B.

Also, the flange portion 130 of the upper body 110, the flange portion 130 of the lower body 120 and the curved portion 220 may be formed of the same material so that the flange portion 130 of the upper body 110, the flange portion 130 of the lower body 120 and the curved portion 220 are easily coupled to each other by welding.

In addition, the upper surface of the flange portion 130 of the lower body 120 coming in contact with the lower surface of the flange portion 130 of the upper body 110 and the lower surface of the flange portion 130 of the upper body 110, and the upper surface of the curved portion 220 coming in contact with the lower surface of the flange portion 130 of the lower body 120 and the lower surface of the flange portion 130 of the upper body 110 may have substantially the same level of illuminance, thereby minimizing defects such as air bubbles generated during the welding.

The damper assembly of the high-pressure fuel pump for reducing fuel pulsation according to one exemplary embodiment of the present invention will be described in detail, as follows.

Figure 7:
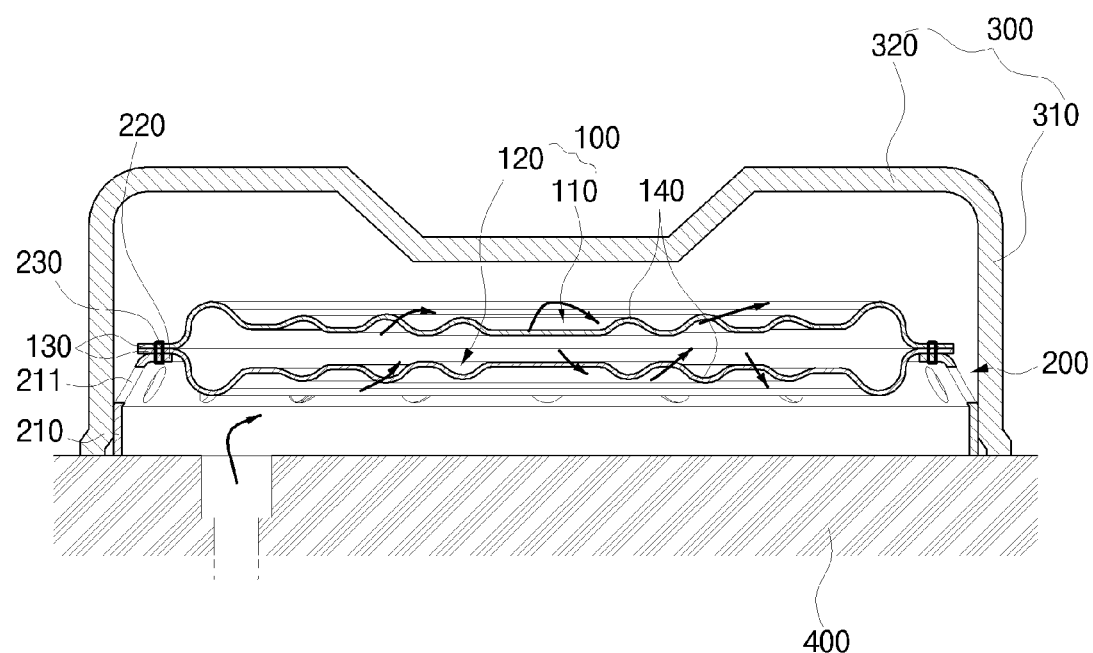
FIG. 7 is a cross-sectional view illustrating a flow of a fuel flowing in the damper assembly according to one exemplary embodiment of the present invention.

As shown in FIG. 7, in the case of the retainer ring 200 constituting the damper assembly, a fuel flowing in from the outside of the damper assembly is allowed to flow in the retainer ring 200 through the through holes 211.

Then, the fuel flowing in the retainer ring 200 comes in contact with the fluctuation portion 140 when the fuel passes through the damper 100. In this case, a flow speed of the fuel is reduced due to the fluctuated surface of the fluctuation portion 140.

As a result, the fuel pulsation caused by driving injectors or a high-pressure fuel pump may be effectively reduced.

That is, the fuel pulsation is caused by the driving of the injectors or the high-pressure fuel pump, but the fluctuation portion 140 of the damper 100 serves to stably transfer the fuel by reducing such fuel pulsation.

As described above, the damper assembly of the high-pressure fuel pump can have a simplified structure since the welding portions 230 are simultaneously formed between the flange portion 130 of the upper body 110 and the flange portion 130 of the lower body 120 and between the flange portion 130 of the lower body 120 and the curved portion 220 of the retainer ring 200 to fix the damper 100 only through the retainer ring 200, thereby reducing an installation space and curtailing manufacturing costs.

Also, the damper assembly of the high-pressure fuel pump can have an effect of improving workability and productivity since the damper 100 and the retainer ring 200 can be coupled by welding to be easily assembled to each other.

The damper assembly of the high-pressure fuel pump according to one exemplary embodiment of the present invention can have a simplified structure since the welding portions are simultaneously formed between the flange portion of the upper body and the flange portion of the lower body and between the flange portion of the lower body and the curved portion of the retainer ring to fix the damper only through the retainer ring, thereby reducing an installation space and curtailing manufacturing costs, and also can have an effect of improving workability and productivity.

The above description merely describes exemplary embodiments of the scope of the present invention, and it will be apparent to those skilled in the art that various modifications can be made to the above-described exemplary embodiments of the present invention without departing from the spirit or the scope of the invention. Accordingly, exemplary embodiments of the present invention are not intended to limit the scope of the invention but to describe the invention, and the scope of the present invention is not limited by the exemplary embodiments. Thus, it is intended that the present invention covers all such modifications provided they come within the scope of the appended claims and their equivalents.

What is claimed is:

1. A damper assembly of a high-pressure fuel pump for reducing fuel pulsation, the damper assembly comprising:
    a damper comprising an upper body and a lower body that face each other in a vertical direction of the damper assembly, the upper body comprising a flange portion disposed along a circumference of the upper body, the lower body comprising a flange portion disposed along a circumference of the lower body;
    a retainer ring comprising a curved portion configured to support the damper and a support portion extending from the curved portion in a longitudinal direction; and
    a cover member configured to surround the damper and the retainer ring,
    wherein welding portions are disposed between the flange portion of the upper body and the flange portion of the lower body and between the flange portion of the lower body and the curved portion of the retainer ring to fix the damper in a housing of the damper assembly,
    wherein the curved portion of the retainer ring is curved towards a center of the retainer ring from an end of the support portion, and is simultaneously welded with the flange portion of the upper body and the flange portion of the lower body.

2. The damper assembly of the high-pressure fuel pump of claim 1, wherein the upper body comprises a fluctuation portion arranged in a concentric shape on an upper surface of the upper body.

3. The damper assembly of the high-pressure fuel pump of claim 1, wherein the lower body comprises a fluctuation portion arranged in a concentric shape on a lower surface of the lower body.

4. The damper assembly of the high-pressure fuel pump of claim 1, wherein the welding portions are disposed at the flange portion of the upper body, the flange portion of the lower body and the curved portion of the retainer ring to be lined up in a band shape or disposed to be spaced at intervals in a spot shape.

5. The damper assembly of the high-pressure fuel pump of claim 1, wherein the support portion comprises a plurality of through holes disposed along a circumferential surface of the support portion.

6. A damper assembly of a high-pressure fuel pump for reducing fuel pulsation the damper assembly comprising:
    a damper comprising upper and lower bodies having flange portions formed along a circumference thereof to face each other in a vertical direction;
    a retainer ring comprising a curved portion configured to support the damper and a support portion extending from the curved portion in a longitudinal direction; and
    a cover member that is configured to surround the damper and the retainer ring, and comprises:
        side plates comprising an inner surface that is in contact with an outer surface of the retainer ring; and
        an upper plate coupled between the side plates,
    wherein the upper plate is spaced from an upper surface of the damper, and
    wherein welding portions are simultaneously formed between the flange portion of the upper body and the flange portion of the lower body and between the flange portion of the lower body and the curved portion of the retainer ring to fix the damper in a housing.

7. The damper assembly of the high-pressure fuel pump of claim 1, wherein only the flange portion of the upper body, the flange portion of the lower body, and the curved portion are welded together.

* * * * *